United States Patent [19]

Ishikawa et al.

[11] Patent Number: 4,491,737
[45] Date of Patent: Jan. 1, 1985

[54] OUTPUT CONTROL SYSTEMS OF COMBINED CYCLE TYPE ELECTRIC POWER GENERATING SYSTEMS

[75] Inventors: Nobumitsu Ishikawa, Machida; Hiroshi Takaoka, Urayasu; Hiroshi Fukuda, Tokyo, all of Japan

[73] Assignee: Tokyo Shibaura Denki Kabushiki Kaisha, Kawasaki, Japan

[21] Appl. No.: 512,015

[22] Filed: Jul. 8, 1983

[30] Foreign Application Priority Data

Jul. 12, 1982 [JP] Japan .................. 57-120751

[51] Int. Cl.³ .............................................. F02C 7/02
[52] U.S. Cl. .................. 290/40 R; 290/4 C; 290/40 C
[58] Field of Search ............. 290/4 R, 4 A, 4 C, 4 D, 290/40 R, 40 B, 40 C

[56] References Cited

U.S. PATENT DOCUMENTS

| 3,812,377 | 5/1974 | Malone | 290/40 X |
| 4,081,956 | 4/1978 | Baker et al. | 290/40 R X |
| 4,136,286 | 1/1979 | O'Halloran et al. | 290/40 C X |
| 4,327,294 | 4/1982 | Smith et al. | 290/40 C |

Primary Examiner—J. V. Truhe
Assistant Examiner—W. E. Duncanson, Jr.
Attorney, Agent, or Firm—Schwartz, Jeffery, Schwaab, Mack, Blumenthal & Koch

[57] ABSTRACT

In a combined cycle type electric power generation system including a plurality of shafts each coupling together a gas turbine, a steam turbine and an electric generator, there is provided an output control system including a plurality of control apparatus for respective shafts. Each apparatus is contracted such that in response to an output command from a central power dispatching station or an output of a load setter, a frequency deviation and a total load of the system and load of each shaft, the total load is equally or unequally distributed among respective shafts.

6 Claims, 8 Drawing Figures

FIG. 8

OUTPUT CONTROL SYSTEMS OF COMBINED CYCLE TYPE ELECTRIC POWER GENERATING SYSTEMS

BACKGROUND OF THE INVENTION

This invention relates to an output control system of a combined cycle electric power generating system comprising a combination of a gas turbine, a steam turbine, and an electric generator.

Figure 1:
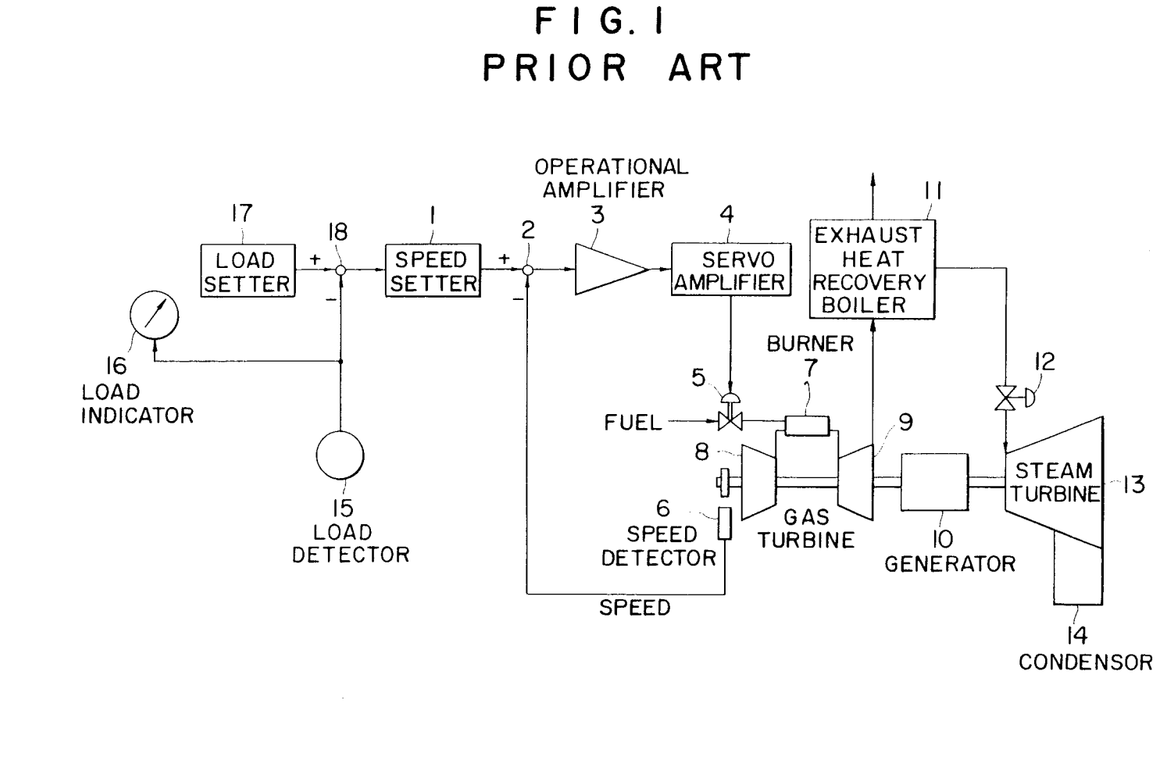
FIG. 1 is a block diagram showing the construction of the prior art load control system of a single shaft combined cycle type electric power generating system.

As a combined cycle electric power generating system has been known a single shaft exhaust heat recovery type combined cycle in which a gas turbine, a steam turbine and an electric generator are combined into a single shaft. Such combined cycle electric power generating system is controlled by a load control system as shown in FIG. 1 in which a speed setting signal from a speed setter 1 is subtracted by a speed signal detected by a speed detector 6 and indicative of the number of revolutions of the gas turbine 8, a steam turbine 13 and a generator 10 (since these machines are mounted on a single shaft, or their shafts are coupled together into a single shaft, their number of revolutions are the same), and the difference signal is subjected to a proportional amplification by an operational amplifier 3. The output thereof is applied to a fuel adjusting valve 5 through a servo-amplifier 4 to control the opening of the valve 5 so as to control the flow quantity of the fuel supplied to the burner 7 of the gas turbine 9, thus controlling the output thereof.

The output of the steam turbine 13 is determined by the degree of vacuum of a condensor 14 when a steam adjusting valve 12 is fully open or maintained at a constant degree of opening because the enthalpy of the steam generated by an exhaust heat recovery boiler 11 is determined by the enthalpy of the exhaust gas of the gas turbine 9. The output of the generator 10 is determined by the sum of the outputs of these turbines multiplied by the efficiency of the generator. The output of the generator 10 is supplied to an electric power system and displayed by a load indicator 16 through a load detector 15. The operator of the power plant controls the generator load by manipulating the speed setter 1 while observing the load indicator 16.

For the purpose of automating the control operation, a load setter 17 and a subtractor 18 may be added. Then the load setting signal from the load setter 17 is subtracted with the load signal from the load detector 15 in the subtractor 18 so as to vary the set value of the speed setter 1 according to the difference. Thus, the control is effected such that the difference becomes zero, or the load, i.e. the generator output becomes equal to the set load value. In this manner, the single shaft type combined cycle electric power generating system is controlled so as to always output a desired electric power.

Considering the running efficiency of the electric power generating plant, the efficiency under a partial load is substantially lower than that under or near the full load. For this reason, a partial load should be avoided as far as possible. However, the output of the electric power generating plant is not always equal to the full load, and a partial load running is often necessary. Moreover, when one of the machines becomes faulty, the output becomes zero.

SUMMARY OF THE INVENTION

It is an object of this invention to provide a novel output control system of a combined cycle type electric power generating system capable of operating under various operating conditions.

Another object of this invention is to provide an output control system of a combined cycle type electric power generation system including a plurality of shafts each coupling together a gas turbine, a steam turbine and an electric generator, and capable of operating the respective shafts under equal or unequal loads.

According to this invention there is provided an output control system of a combined cycle type electric power generation system including a plurality of shafts each coupling together a gas turbine, a steam turbine and an electric generator, the output control system comprising a central power dispatching station for producing an output commmand, a selector for selecting either one of the output command and a signal produced by a load setter, a first adder for adding together a signal selected by the selector and a signal generated by a function generator and corresponding to a frequency deviation of the electric power generation system, a load detector producing a load signal representing a total load of the electric power generation system, a first subtractor for producing a difference signal between an output of the first adder and the load signal, first calculating means for effecting a proportional integration of the difference signal to produce an output instruction common to all of the shafts, and a plurality of control apparatus for respective shafts, each apparatus including a second adder for adding together the output instruction and an output of a second function generator corresponding to the frequency deviation, a load detector of a predetermined one of the shafts, a second subtractor for subtracting an output of the load detector of the predetermined shaft from an output of the second adder, second calculating means for processing an output of the second subtractor to produce a control signal such that the output of the second subtractor becomes zero, and means responsive to the control signal for setting a speed of the predetermined shaft.

According to a modification of this invention, each of the control apparatus for respective shafts includes a speed setter for a predetermined one of the shafts, a second subtractor supplied with an output of the first calculating means and a signal fed back from the speed setter, second calculating means for processing an output of the second subtractor to produce a control signal such that the output of the second subtractor becomes zero, and means for applying the control signal to the speed setter.

According to this modification the total load of the electric power generation system can be unequally distributed among the plurality of shafts.

DESCRIPTION OF THE PREFERRED EMBODIMENTS

Figure 2:
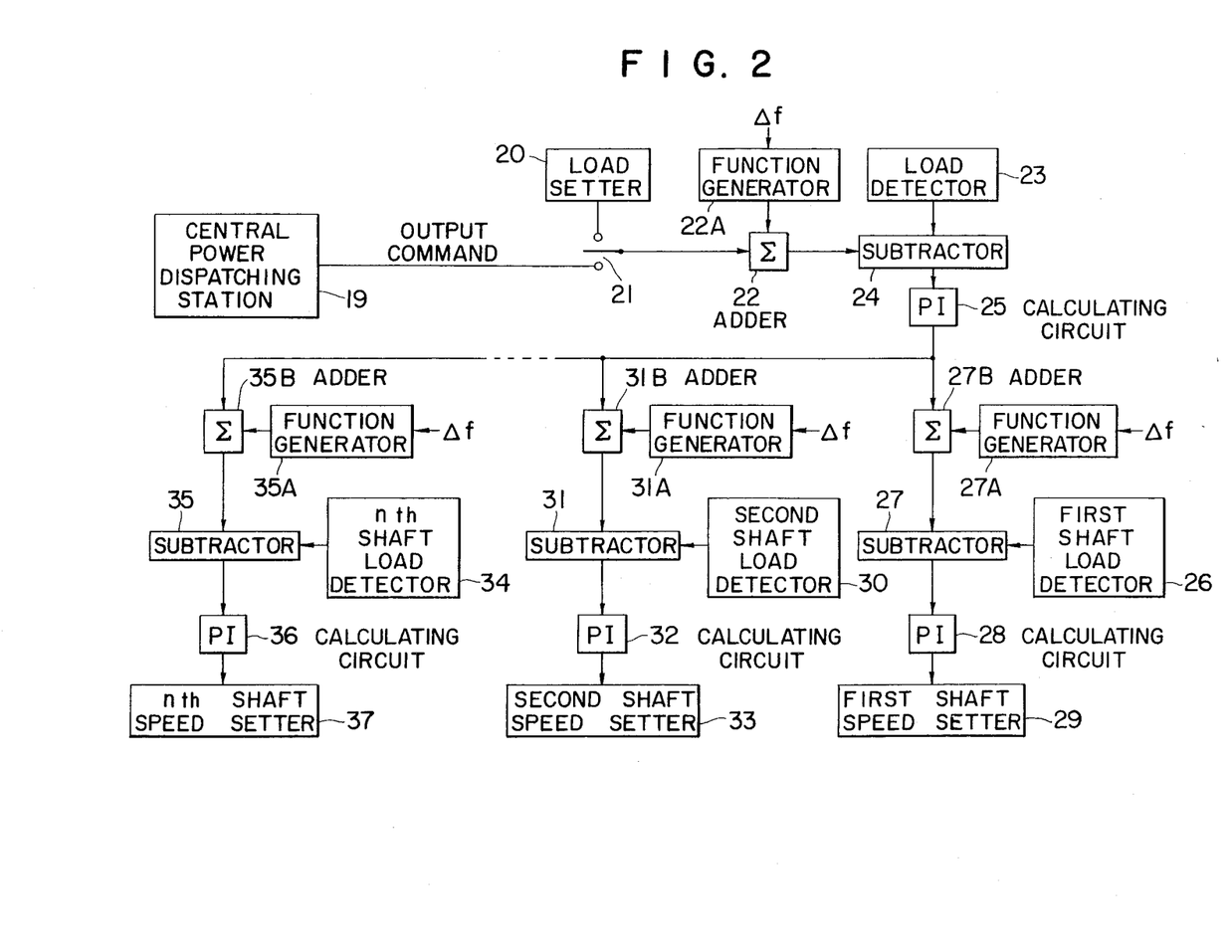
FIG. 2 is a block diagram showing one embodiment of the control system of this invention in which load is uniformly distributed among various shafts.

Referring now to FIG. 2, there is shown a preferred embodiment of the control system according to this invention in which n (a positive integer) single shaft combined cycle type electric power generating systems are provided. For the sake of brevity, the gas turbines, steam turbines and generators of respective systems are not shown.

In each shaft, either one of the output command from a central power distribution station 17 and a set signal from a load setter 20 is applied to an adder 22 through a transfer switch 21. The adder 22 adds the selected signal to a signal generated by a function generator 22A in accordance with a frequency deviation $\Delta f$. The output of the adder 22 is applied to a subtractor 24 to be subtracted from the output of a load detector 23 representing the sum of the outputs of all generators. The output of the subtractor 24 is applied to a calculating circuit 25 to be subjected to a proportional integration to form an output instruction common to respective shafts. Thus, the output instruction increases or decreases in accordance with the variation in the electric power system frequency and the variation in the output.

This output instruction common to all shafts is applied to subtractors 27, 31 and 35 of respective shafts. These subtractors form output instructions for respective shafts. For example, subtractor 27 subtracts the output of a first shaft load detector 26 from the common output instruction and applies the difference to a calculating circuit 28 to effect a proportional integration operation. The result of integration is applied to a first shaft speed setter 29.

Instead of a proportional integration, the calculating circuit 28 (32, 36) may be constructed by a calculating circuit which, when the difference signal from the subtractor 27 (31, 35) exceeds a predetermined level, produces a plus or minus output of a constant level. When this output is supplied to the shaft speed setter 29 (33, 37), the control system operates to make zero the output of the subtractor 27 (31, 35) by a feedback system including the load detector 23.

Regarding the second shaft, a signal similarly obtained by a second shaft load detector 30, subtractor 31 and calculating circuit 32 is given to a second shaft speed setter 33. In the same manner, with regard to the nth shaft, a signal obtained by nth shaft load detector 34, subtractor 35, and calculating circuit 36 is applied to the nth shaft speed setter 37.

With this construction, the load is uniformly distributed among the first through nth combined cycle type electric power generating systems, so that increment and decrement of the load of respective shafts at the time of load variation are also uniform.

Assume now that the rated output of the entire plant is W and that the rated outputs of respective shafts are the same. Then, the rated output of each shaft would be W/n. Furthermore, it is assumed that the central power dispatching station 17 applies a command to the adder 22 via transfer switch 21 such that the plant would produce an output of x%, i.e. $W \times x/100$. Where the command is sent through a telephone system or the like from the central power dispatching station 17, the operator sets the load setter 20 to x%, and transfers the transfer switch 21 to the side of the load setter 20.

Figure 3:
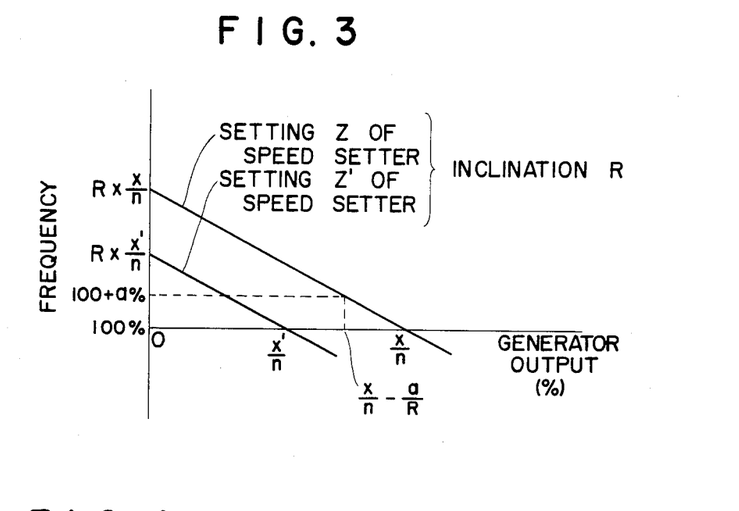
FIG. 3 is a graph showing the relationship between the generator output and frequency.

The adder 22 adds a frequency deviation $\Delta f$ of the power signal to the set signal of x% to form a governor free compensated signal which is applied to subtractor 24. The term governor free compensation means the following function. Where the load setter 20 and the subtractor 18 are not provided for the circuit shown in FIG. 1 and where it is assumed that the operational amplifier 3 has a proportionality gain of 1/R, in the usual electric power generating plant, the relation between the frequency and the generator output is shown by FIG. 3. In FIG. 3 two oblique lines having an inclination of R show different settings Z and Z' of the speed setter 1 shown in FIG. 1. More particularly, as the frequency of the power system increases by a%, the generator output decreases by a/R% which contributes to the frequency adjustment of the power system in accordance with the capacities of respective electric power generating plants. This function is called governor-free function.

When the load setter 17 and the substractor 18 are added to the system shown in FIG. 1, the generator output increased or decreased by the governor free function is fed back to the control system through the load detector 15 so as to form a difference with reference to the load setter 17. This difference varies the setting of the speed setter so as to return to the originally set load value. This would cancel the governor free operation.

In order to maintain the governor free function, it is necessary to change the set load value by corresponding amount. This is termed the governor free compensation.

Figure 4:
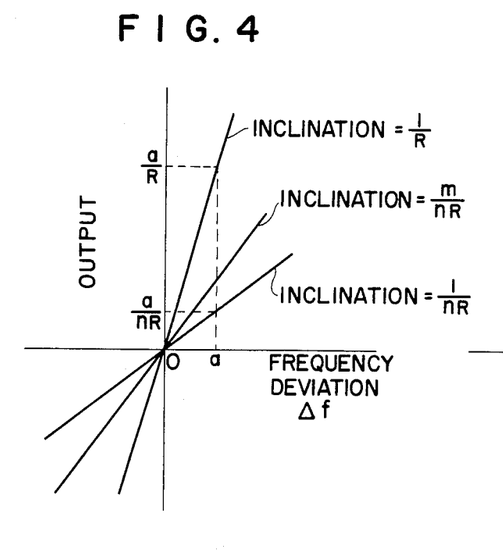
FIG. 4 is a graph showing the relation between frequency deviation and output of the function generator 22' shown in FIG. 2.
Figure 5:
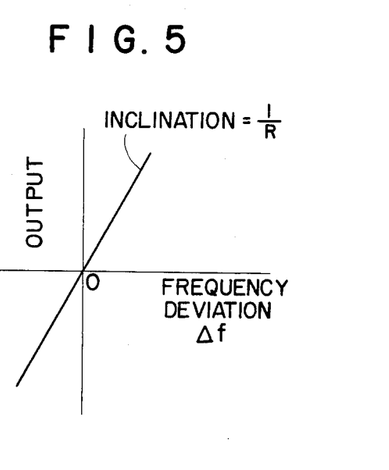
FIG. 5 is a graph showing the relation between the frequency deviation and the output of the function generators 27A, 31A and 35A shown in FIG. 2.

In the system shown in FIG. 2, the governor free compensation can be accomplished by causing the function generator 22A to have characteristics as shown in FIG. 4. The governor free compensations for respective shafts can be done by adding signals $\Delta f$ to the command through function generators 27A, 31A and 35A with adders 27B, 31B and 35B. In the same manner as the conventional electric power generating plant, each of the function generators 27A, 31A and 35A has a characteristic as shown in FIG. 5.

Assuming that m shafts are connected to the electric power system, the governor free compensation function is as follows: In this case, an inclination m/nR is selected for the function generated by the function generator 22A. When the frequency of the electric power system increases by a%, $$\Delta f = \text{rated frequency} - \text{power system frequency} = -a\%.$$

Accordingly, in adder 22, ma/nR is added to the command.

Since the outputs of m generators are decreased by a/R%, respectively the load detector 23 would detect $m/2 \times a/R\%$. Accordingly, the subtractor 24 does not produce any difference signal.

Since the governor free compensation is made for each shaft, the subtractors 27B, 31B and 35B do not produce any difference signal so that the speed setters 29, 33 and 37 of respective shafts are not operated.

Accordingly, satisfactory governor free functions can be assured.

The operations of the circuit elements succeeding the subtractor 24 will be described. The governor free compensated signal applied to the subtractor 24 has a content of x% same as the command so long as the frequency of the power system is maintained at the rated frequency. Based on this signal, the subtractor 24 continues to produce a positive or negative signal until the output of the plant becomes $W \times x/100$, that is the signal from the load detector 23 becomes x%. As a result, the output too of the calculating circuit 25 continues to increase or decrease.

When the output from the load detector 23 becomes x%, the output from the subtractor 24 becomes zero, and the output of the calculating circuit 25 would not vary from x%. As above described, the output of the calculating circuit 25 is applied to adders 27B, 31B and 37B to perform governor free compensations for respective shafts, and the compensated outputs of the adders 27B, 31B and 37B are respectively applied to subtractors 27, 31 and 35. For example, until the output of the first shaft generator being supplied with a signal of x% become $W/n \times x/100$, that is until the signal from the first shaft load detector 26 becomes x%, the subtractor 27 continues to produce a positive or negative signal. Accordingly, in response thereto, the output of the calculating circuit 28 continues to increase or decrease. When the signal from the load detector 26 becomes x%, the output of the subtractor 27 becomes zero so that the output of the calculating circuit 28 would not vary. By this time, the output of the plant has become to x%, so that the first shaft speed setter 29 is set to a value corresponding to a load of x%. The speed setter 29 shown in FIG. 2 corresponds to the speed setter 1 shown in FIG. 1. Thereafter, in the same manner as above described, the quantity of the fuel supplied to the gas turbine is controlled to ultimately control the output of the plant, that is, the generator output to $W/n \times x/100$.

Identical controls are made for the second, third, . . . nth shafts. Thus, all shafts produce outputs $W/n \times x/100$, whereby the output of the entire plant becomes $W \times x/100$.

Figure 6:
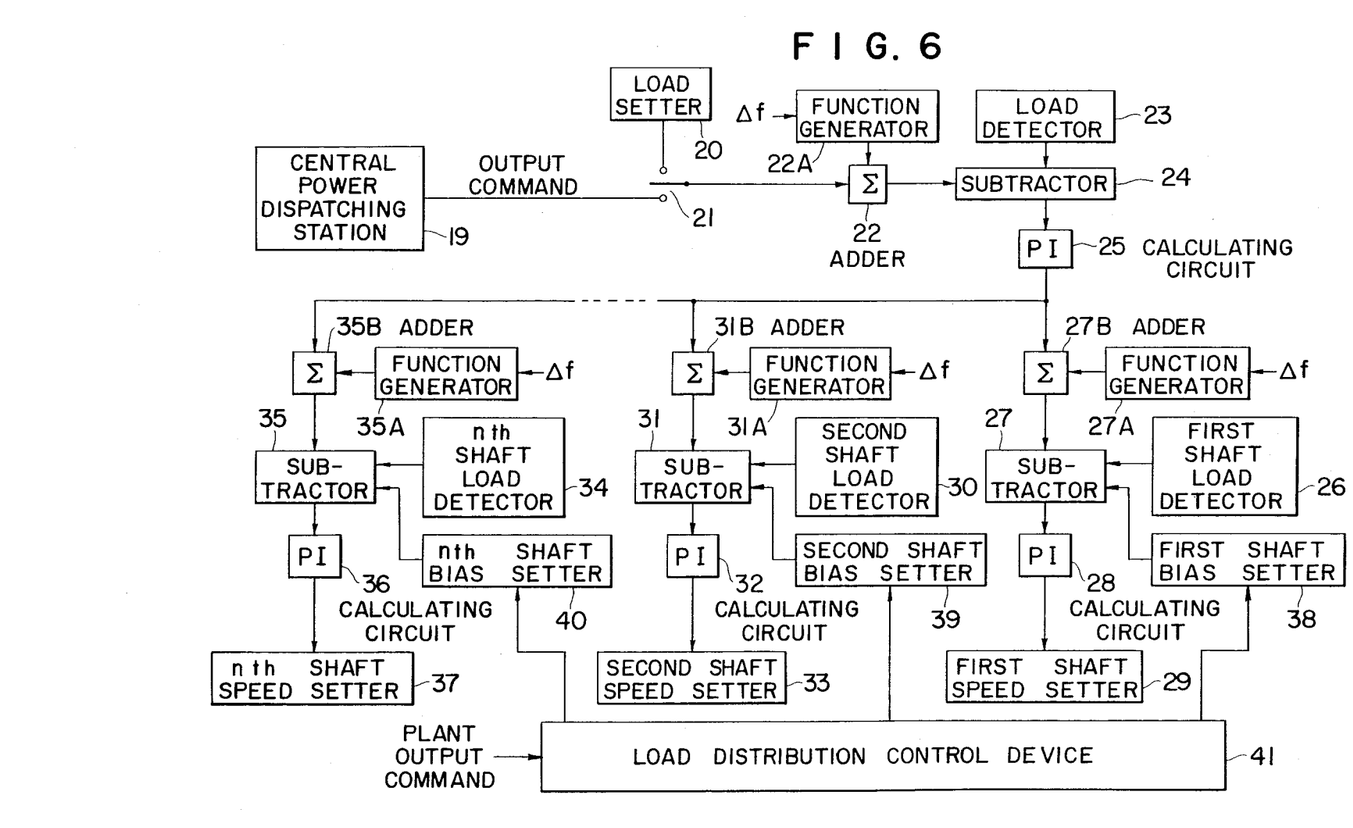
FIGS. 6 and 7 are block diagrams showing modifications of this invention in which different loads are distributed among various shafts.

FIG. 6 shows another embodiment of this invention, in which for the purpose of making unequal the load distribution among respective shafts, bias signals are applied to subtractors 27, 31 and 35 from first shaft bias setter 38, second shaft bias setter 39 . . . the nth shaft bias setter 40, respectively which respond to the outputs of a load distribution controller 41 which is supplied with the plant output command for determining load distribution among respective shafts. The controller 41 may be constituted by a microcomputer or the like.

Suppose now that the plant output is $W \times x/100$, and that it is desired to apply a load $W/n \times (x-y)/100$ to the first shaft, and a load $W/n \times 1/100 \cdot (x+y/n-1)$ to the second, the third, . . . and the nth shafts, a signal is outputted from the load distribution controller 41 such that $-y\%$ is set in the first shaft bias setter 38 and $y/(n-1)$ is set in the bias setters 39 and 40 of the second through nth shafts.

The subtractor 27 subtracts the output of the first shaft load detector 26 from the sum of the output x% of the calculating circuit 25 and the output $-y\%$ of the bias setter 38, that is $(x-y)\%$ so as to produce a negative signal. The output of the subtractor 27 becomes zero, that is until the output of the first shaft load detector 26 becomes $(x-y)\%$, thus continuing to decrease the output of the calculating circuit 28.

As the output signal of the first shaft load detector 26 becomes $(x-y)\%$, the output signal of the calculating circuit 28 stops to vary and also becomes $(x-y)\%$. This signal sets the first shaft speed setter 29 to a value corresponding to the load of $(x-y)\%$, so that the output of the generator of the first shaft becomes $W/n \times (x-y)/100$.

In the same manner, the settings of the first to nth shaft speed setters are changed such that the output signals of the first through nth shaft load detectors would become $x+y/n-1$, so that the ultimate outputs of the generators of respective shafts would become $$W/n \times 1/100 \cdot \left( x + \frac{y}{n+1} \right)$$

Consequently, the overall output is expressed by $$W/n \times (x - y)/100 + (n - 1) \times W/n \times 1/100 \left( x + \frac{y}{n - 1} \right) = W \times x/100$$

which is the same as that of the embodiment shown in FIG. 2. According to this modification, although it is possible to set the load distribution among various shafts to any desired value, it is possible to operate the entire system by taking into consideration the efficiencies of the plant as a whole and of respective generators.

Figure 7:
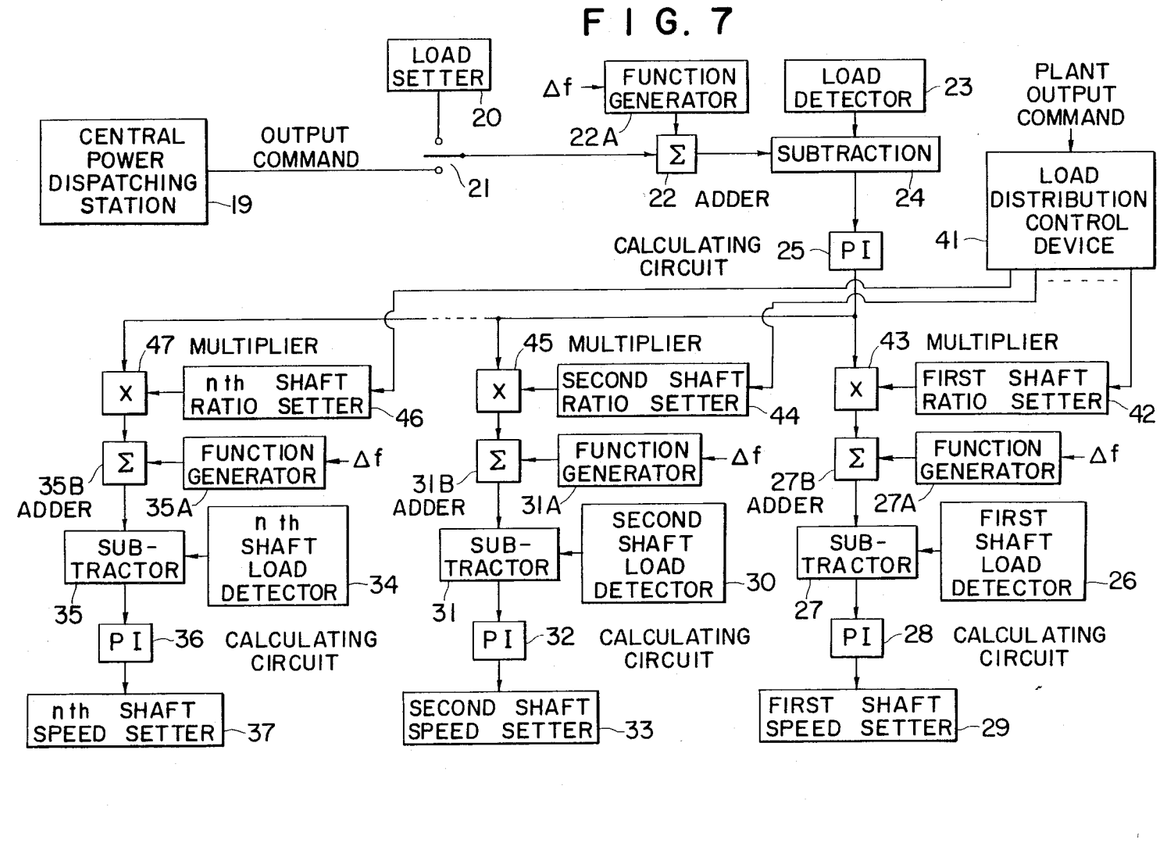

FIG. 7 shows another modified embodiment in which instead of providing bias setters as in FIG. 6, there are provided ratio setters 42, 44 and 46 producing ratio outputs which are respectively multiplied with the outputs of the calculating circuit 25 in multipliers 43, 45 and 47. The products thus obtained are applied to subtractors 27, 31 and 35 respectively. This modification operates in the same manner as that shown in FIG. 6.

Figure 8:
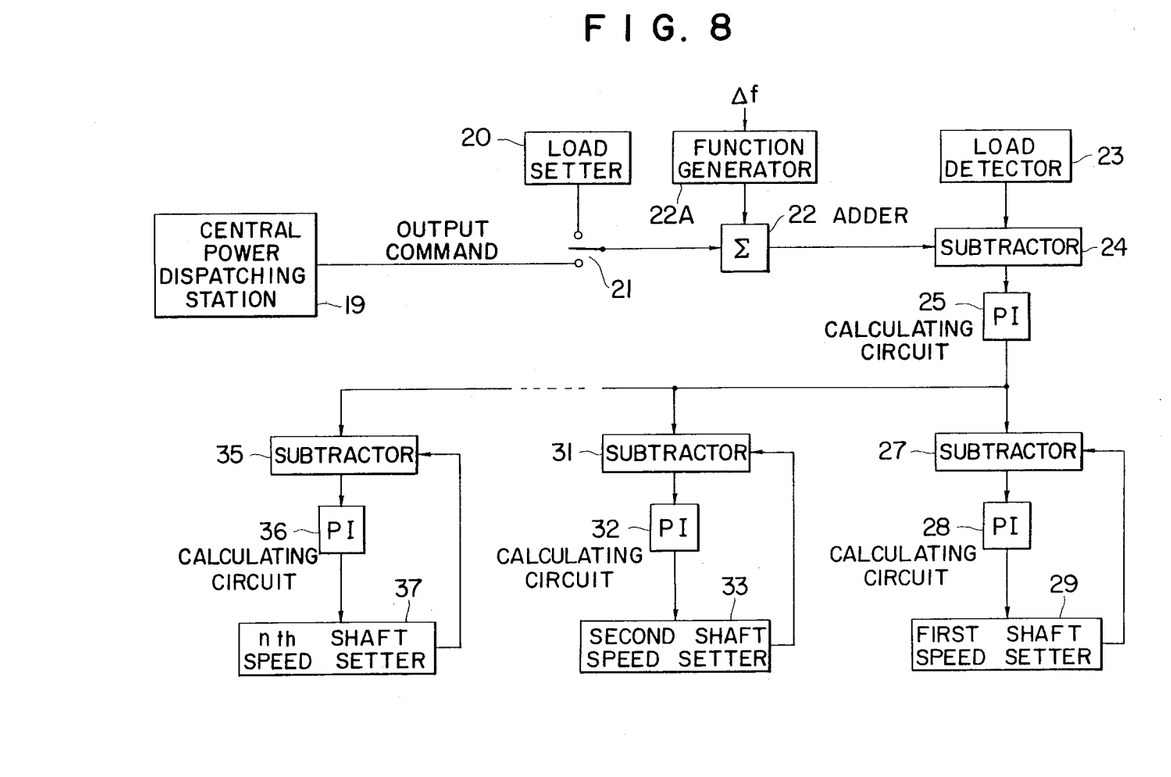
FIG. 8 is a block diagram showing a modification of the control apparatus for respective shafts.

In still another modification shown in FIG. 8, set values of respective shaft speed setters 29, 33 and 37 are fed back to subtractors 27, 31 and 35. With this construction, delays in the feedback signals are minimized, thus assuring more stable control. In the previous embodiments a feedback control was made through load detector 23 which detects load variation of the system so that the feedback control was somewhat lagged. This modification eliminates huntings at the time of load variation caused by unequal time lags of the outputs of respective generators.

Although in the foregoing embodiments it was assumed that the rated loads of respective shafts are equal, the same advantageous effect can also be realized even when the rated loads of respective shafts are not equal in which case all control signals are converted into ratios.

Where the speed setters of some of the shafts are manually operated instead of controlling them by the apparatus of this invention, so long as there are margins in the generator capacities of the remaining shafts the overall plant output can be controlled with the apparatus of this invention.

According to this invention, in a system comprising a plurality of combined type electric power generating systems, since the system is controlled as a unit by applying the same or different load on respective generators it is possible to smoothly and efficiently control respective shafts to meet load demands.

We claim

1. An output control system of a combined cycle type electric power generation system including a plurality of shafts each coupling together a gas turbine, a steam turbine and an electric generator, said output control system comprising:
   a central power dispatching station for producing an output command;
   a selector for selecting either one of said output command and a signal produced by a load setter;
   a first adder for adding together a signal selected by said selector and a signal generated by a function generator and corresponding to a frequency deviation of said electric power generation system;
   a load detector producing a load signal representing a total load of said electric power generation system;
   a first subtractor for producing a difference signal between an output of said first adder and said load signal;
   first calculating means for effecting a proportional integration of said difference signal to produce an output instruction to all of said shafts; and
   a plurality of control apparatus for respective shafts; each control apparatus including:
   a second adder for adding together said output instruction and an output of a second function generator corresponding to said frequency deviation,
   a load detector of a predetermined one of said shafts,
   a second subtractor for subtracting an output of said load detector of said predetermined shaft from an output of said second adder,
   second calculating means for processing an output of said second subtractor to produce a control signal such that the output of said second subtractor becomes zero, and
   means responsive to said control signal for setting a speed of said predetermined shaft.

2. The output control system according to claim 1 which further comprises load distribution control means and a plurality of bias setters for respective shafts connected to receive outputs of said load distribution control means, output signals of said bias setters being applied to said second subtractors of respective shafts so as to make unequal load distribution among respective shafts.

3. The output control system according to claim 2 wherein said load distribution control means is applied with a plant output command.

4. The output control system according to claim 1 which further comprises load distribution control means and a plurality of ratio setters for respective shafts connected to receive outputs of said load distribution control means, output signals of said ratio setters being applied to multipliers of respective shafts connected between said first calculating means and said second adders of said respective shafts.

5. The output control system according to claim 4 wherein said load distribution control means is applied with a plant output command.

6. An output control system of a combined cycle type electric power generation system including a plurality of shafts each coupling together a gas turbine, a steam turbine and an electric generator, said output control system comprising:
   central power dispatching station for producing an output command;
   a selector for selecting either one of the output command and a signal produced by a load setter;
   a first adder for adding together a signal selected by said selector and a signal generated by a function generator and corresponding to a frequency deviation of said electric power generation system;
   a load detector producing a load signal representing a total load of said electric power generation system;
   a first subtractor for producing a difference signal between an output of said first adder and said load signal;
   first calculating means for effecting a proportional integration of said difference signal to produce an output command common to all of said shafts; and
   a plurality control apparatus for respective shafts:
   each apparatus including a speed setter for a predetermined one of said shafts; a second subtractor supplied with an output of said first calculating means and a signal fed back from said speed setter ; second calculating means for processing an output of said second subtractor to produce a control signal such that the output of said second subtractor becomes zero; and means for applying said control signal to said speed setter.

* * * * *